United States Patent [19]

Gerber et al.

[11] Patent Number: 4,619,703
[45] Date of Patent: Oct. 28, 1986

[54] STABLE AQUEOUS DISPERSIONS OF NON-OXIDIZED PARAFFIN WAX

[75] Inventors: Hans Gerber, Allschwil; Eckart Schleusener, Reinach, both of Switzerland

[73] Assignee: Sandoz Ltd., Basel, Switzerland

[21] Appl. No.: 676,590

[22] Filed: Nov. 30, 1984

Related U.S. Application Data

[63] Continuation of Ser. No. 537,119, Sep. 29, 1983, abandoned.

[30] Foreign Application Priority Data

Oct. 4, 1982 [DE] Fed. Rep. of Germany ....... 3236672

[51] Int. Cl.$^4$ .................... C08L 91/06; D06M 13/34
[52] U.S. Cl. ........................................ 106/271; 8/196; 252/8.8
[58] Field of Search .............................................. 8/197

[56] References Cited

U.S. PATENT DOCUMENTS

| | | | |
|---|---|---|---|
| 2,809,159 | 10/1957 | Wells et al. ............................ | 252/8.8 |
| 4,144,122 | 3/1969 | Emanuelsson et al. ............. | 162/158 |
| 4,208,345 | 6/1980 | Amati ................................... | 252/358 |
| 4,208,385 | 6/1980 | Robbins et al. ...................... | 423/226 |
| 4,254,823 | 3/1981 | Cederqvist et al. ................. | 162/158 |
| 4,329,390 | 5/1982 | Danner ................................. | 106/271 |

FOREIGN PATENT DOCUMENTS

| | | |
|---|---|---|
| 0013820 | 6/1980 | European Pat. Off. . |
| 2502357 | 8/1975 | Fed. Rep. of Germany . |
| 1186404 | 4/1970 | United Kingdom . |
| 1338732 | 11/1973 | United Kingdom . |
| 2070040 | 9/1981 | United Kingdom . |

OTHER PUBLICATIONS

Chem. Abstract 93:188,128v.

*Primary Examiner*—Theodore Morris
*Attorney, Agent, or Firm*—Gerald D. Sharkin; Richard E. Vila; Thomas C. Doyle

[57] ABSTRACT

Aqueous wax dispersions containing a non-oxidized paraffin wax, a cationic surfactant of formula I

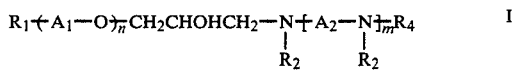

in which the significances of the symbols are given in the text, and optionally a cold stabilizer such as ethylene glycol, have excellent stability when used for textile finishing under high-shear conditions, for example in jet dyeing machines.

23 Claims, No Drawings

STABLE AQUEOUS DISPERSIONS OF NON-OXIDIZED PARAFFIN WAX

This is a continuation of application Ser. No. 537,119, filed Sept. 29, 1983, now abandoned.

This invention relates to aqueous wax dispersions. In finishing operations on textile substrates, whether fibres, yarns, woven goods or other products, in which a lubricant finish is applied in the form of an aqueous dispersion, it is often desirable to use non-oxidised paraffin waxes. It is however difficult to bring non-oxidised paraffins into a stable disperse form which can readily be diluted with water, and it is a particular problem in textile technology to prepare aqueous paraffin wax emulsions which are stable under conditions of high and variable dynamic stress, as is found for example in jet dyeing machines.

It has now been found that such stable dispersions may be obtained by the use of particular cationic surfactants.

Accordingly, the present invention provides aqueous wax dispersions containing a cationic surfactant, in which substantially all of the wax is non-oxidised paraffin wax having a drip point $\geq 30°$ C. and the cationic surfactant comprises one or more compounds of formula I

   I in which
$R_1$ is $R_xCOO-$, $R_x CONH-$ or $R_yO-$
where $R_x$ is $C_{7-21}$alkyl or $C_{7-21}$alkenyl
and $R_y$ is $C_{8-22}$alkyl, $C_{8-22}$alkenyl or a group ($\alpha$)

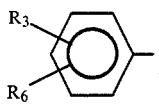   ($\alpha$)

where $R_3$ is H or $C_{1-9}$alkyl and $R_6$ is $C_{4-12}$alkyl;
$R_2$ is H, $C_{1-22}$alkyl, $C_{2-22}$alkenyl, benzyl or a group (b)

   (b);

$R_4$ is H, $C_{1-22}$alkyl, $C_{2-22}$alkenyl or a group (b);
$R_5$ is a group (c), (d) or (e)

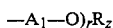   (c)

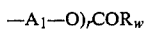   (d)

   (e)

where $R_w$ is $C_{1-21}$alkyl or $C_{2-21}$alkenyl
and $R_z$ is $C_{1-22}$alkyl, $C_{2-22}$alkenyl or a group ($\alpha$);
$A_1$ is $-CH_2CH_2-$ or $-CH_2CH(CH_3)-$;
$A_2$ is $C_{2-6}$alkylene
n is 2-20
m is 0-4
p is 0 or 1
q is 0-19 and r is 0 or 1 provided that $(p+q+r)\geq 1$;
or protonated or quaternised derivatives thereof.

By the term "substantially all of the wax is non-oxidised paraffin wax" is meant that the acid number of the total wax present is less than 1, preferably less than 0.5.

The non-oxidised paraffin waxes are generally obtained from the processing of fossil hydrocarbon mixtures, for example crude oil, bitumen, asphalt, tar, lignite and coal, particularly crude oil and lignite. The most usual source is from the distillation of crude oil, particularly heavy oil fractions such as gas oil and lubricating oil. From spindle oil and light and medium viscosity machine oil are obtained paraffin waxes which are richer in n-paraffins, while heavy machine oil and cylinder oil distillation residues give rise to waxes containing a higher proportion of iso- and cyclic paraffins.

Paraffin waxes are obtained initially as mixtures with oil, for example as slack waxes or petrolatum. Slack waxes can be refined by removal of oil, particularly when they are low in isoparaffins, and waxes from the lighter oil fractions can give rise to very pure n-paraffin waxes containing up to 93% n-paraffin. Isoparaffin slack waxes are more difficult to refine and can be only partially de-oiled. Petrolatums have a high isoparaffin content, and microcrystalline waxes may be obtained from them.

The compositions according to the invention may contain pure n-paraffin waxes, pure isoparaffin waxes (microcrystalline waxes) or mixtures thereof. The wax may contain oil, but the oil content should preferably not be so high that the oil separates out from the wax of its own accord. Preferably the oil content is from 0-30% by weight, more preferably 0.2-15%, whereby for isoparaffin waxes the upper end of the range of oil content is preferred whereas for n-paraffin waxes the lower end of the range, particularly $\leq 5\%$ is preferred. The oil content may be adjusted for example by mixing together high- and low-oil waxes, or by adding oil to a low-oil wax.

Preferred waxes contain mixtures of n- and iso-paraffins in which the n-paraffin content is 30-90 wt.%, more preferably 65-90 wt.%, particularly 80-90 wt.%. Particularly preferred are such waxes which contain little or no oil.

The solidification point of the paraffin wax may vary over a wide range, but is preferably between 40° and 100° C., more preferably 50°-65° C. The needle penetration measured according to ASTM D 1321 may also vary widely, for example from 5 to 150. Preferably hard paraffin waxes are used whose needle penetration lies in the range 10-30.

Suitable waxes are described for example in "Mineralöle und verwandte Produkte", C. Zerbe, Springer-Verlag (2nd edition, 1969), particularly in chapters 2 and 8.

In the compounds of formula I, whenever a symbol appears more than once, it may have the same or different significances.

$R_1$ is preferably $R_yO-$. The group $R_x$ contains preferably 11-21, more preferably 15-19 carbon atoms, and is preferably alkyl. When it is alkenyl, it is preferably oleyl. The group $R_y$, when alkyl or alkenyl, preferably contains 12-22, more preferably 16-22, most preferably 16-20 carbon atoms. When $R_y$ is a group ($\alpha$), then the group $R_6$ is preferably in the p-position. Preferably the sum of the carbon atoms in groups $R_3$ and $R_6$ is from 8 to 12. $R_3$ is preferably $R_3'$ where $R_3'$ is hydrogen or n-, iso-, or tert.-butyl; $R_6$ is preferably $R_6'$ where $R_6'$ is $C_{4-9}$alkyl. Particularly preferred groups ($\alpha$) are dibutylphenyl, octylphenyl and nonylphenyl.

$R_y$ is preferably $R_y'$ where $R_y'$ is $C_{12-22}$alkyl, $C_{12-22}$alkenyl or a group (α')

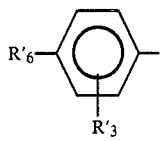

where $R_3'$ and $R_6'$ are defined above. More preferably $R_y$ is $R_y''$ where $R_y''$ is $C_{16-22}$alkyl or $C_{16-22}$alkenyl.

Preferably at least 50% of the groups $A_1$ are 1,2-ethylene groups, more preferably all groups $A_1$ are 1,2-ethylene. The number of $—A_1—O—$ groups, n, is preferably $n_1$ where $n_1$ is 3–12, more preferably $n_2$ where $n_2$ is 4–8. It will be appreciated that the value of n represents an average value, and may be non-integral.

The group $A_2$ is preferably 1,2-ethylene, 1,3-propylene or 1,6-hexylene, of which 1,2-ethylene and, particularly, 1,3-propylene, are preferred. The number m is preferably 0, 1 or 2, more preferably 1.

The groups $R_2$ and $R_4$ are preferably hydrogen, $C_{1-22}$alkyl, $C_{2-22}$alkenyl or a group of formula (a)

$$R_1—A_1—O)_n CH_2 CHOH—CH_2— \quad (a)$$

this being a preferred form of group (b), in which p=1, and $R_5$ is a group (c), (d) or (e) in which $R_z=R_y$, $R_w=R_x$ and (r+q)=n. Preferably the compound of formula I contains at least one alkyl or alkenyl group of 8–22 carbon atoms bound directly to nitrogen, and this is preferably the group $R_4$. Preferably the molecule contains more than one group (a), and more preferably at least one of the groups $R_2$ is a group (a).

Preferred groups (a) are those of formula (a')

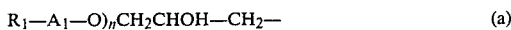

in which $R_y'$ and $n_1$ are defined above. More preferred groups (a) are those of formula (a'')

in which $R_y''$ and $n_2$ are defined above.

Preferably $R_2$ is $R_2'$ where $R_2'$ is hydrogen, $C_{1-22}$alkyl or a group of formula (a') above; more preferably $R_2''$ where $R_2''$ is hydrogen or a group of formula (a'') above. The group $R_4$ is preferably $R_4'$ where $R_4'$ is $C_{8-22}$alkyl, $C_{8-22}$alkenyl or a group (a'); more preferably $R_4''$ where $R_4''$ is $C_{16-22}$alkyl or $C_{16-22}$alkenyl.

A preferred group of compounds of formula I are those of formula I'

in which $R_y'$, $n_1$, $R_2'$ and $R_4'$ are defined above, w is 2 or 3 and $m_1$ is 0–2.

A more preferred group are those of formula I''

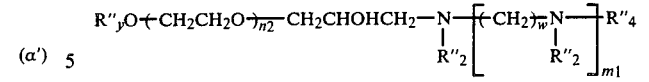

and particularly those of formula I'''

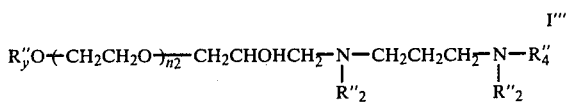

in which $R_y''$, $n_2$, $R_2''$ and $R_4''$ are defined above, and at least one of the two groups $R_2''$ is a group of formula (a''). Most preferably, $R_y''$ and $R_4''$ are $C_{16-20}$alkyl or $C_{16-20}$alkenyl, particularly stearyl or oleyl, and $n_2$ is 5–8.

Compounds of formula I are cationic surfactants, this term being used to mean a surfactant the active part of the molecule of which bears one or more positive charges or is readily protonated so as to bear one or more positive charges. The compounds of formula I may be obtained in protonated form by the action of acids, for example hydrochloric or sulphuric acid, low molecular aliphatic organic acids such as formic acid, acetic acid, tartaric acid or citric acid, preferably formic acid and, particularly, acetic acid.

The compounds of formula I may also be obtained in quaternised form by reaction of at least one nitrogen atom with a quaternising agent for example methyl or ethyl chloride, bromide or iodide or dimethyl or diethyl sulphate. Preferably however, the surfactants are in non-quaternised form.

The compounds of formula I are known or may be prepared in conventional manner from available starting materials, for example by reaction of a compound of formula II $$H_2N—A_2—NH)_m R_4 \quad \text{II}$$

with at least one molecule of a compound of formula III

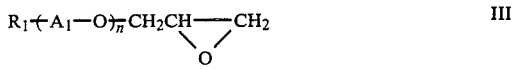

and, if groups $R_2$ are other than (a), with one or more compounds of formula IV or V $$R_2—X \quad \text{IV}$$

where X is $—Cl$, $—Br$ or $—I$

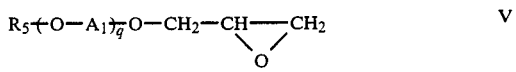

and optionally protonating or quaternising the product.

Compounds III and V may be produced by dehalohydrogenation of the corresponding halohydride, for example by the action of aqueous alkali (e.g. NaOH) at a temperature of 30°–80° C. The resulting epoxide may be reacted with the amine of formula II in the same aqueous reaction medium, at temperatures of 50°–100° C. The water may then be removed by distillation and the salts (e.g. NaCl) removed by hot filtration of the residue at temperatures above the melting point of the compound of formula I, e.g. at 70°-100° C.

Preferably the product is used as such without protonation or quaternisation, protonation occurring only during the production of the aqueous wax dispersion.

In the aqueous wax dispersion according to the invention, the quantity of surfactant used must be at least sufficient to disperse the wax in water, but an excess over this amount may be used. Preferably for 100 parts by weight of wax at least 20, preferably 20-150, more preferably 40-120 parts by weight of the cationic surfactant is used. The higher the n-paraffin content of the wax, the more surfactant should be used; thus for 100 parts by weight of a wax containing at least 65% n-paraffins at least 50 parts by weight of surfactant should preferably be added whereas 100 parts of a wax containing at least 80% n-paraffins should preferably have at least 80 parts of surfactant.

The quantity of water used must be at least sufficient to make the dispersion stirrable and pourable; preferably the dry weight of wax plus surfactant is no more than 50%, preferably 5-50%, more preferably 10-30% by weight of the total dispersion. The pH of the dispersion is preferably adjusted to lie in the range 3-6 by addition of acid; more preferably it is in the range 3-4.5, whereby the free base form of the surfactant becomes at least partially converted to the protonated form.

The dispersion may also contain a conventional cold stabiliser to hinder freezing of the aqueous phase with consequent destabilisation of the dispersion, for example a water soluble mono- or polyhydric alcohol (e.g. isopropanol, ethylene glycol, hexylene glycol or glycerol) or a water soluble polyalkylene glycol or mono- or polyalkyleneglycol ether (e.g. diethylene glycol, methyl cellosolve or ethyl cellosolve). The quantity of cold stabiliser used is preferably from 0 to 40% by weight of the amount of water present, more preferably 5-20%, particularly 7-15%.

A preferred composition according to the invention is one in which, for 100 parts by weight of wax there is present 20-150 parts by weight of surfactant of formula I, sufficient acid to bring the pH in the range 3-6, sufficient water to bring the dry weight of wax plus surfactant to 5-50% by weight of the dispersion, and from 0-40% of the weight of water of a cold stabiliser.

A more preferred composition is one in which, for 100 parts by weight of wax there is present 40-120 parts by weight of surfactant of formula I, sufficient acid to bring the pH in the range 3-4.5, sufficient water to bring the dry weight of wax plus surfactant to 10-30% by weight of the dispersion, and from 5-20% of the weight of water of a cold stabiliser.

It will be appreciated that each component of the composition according to the invention may itself be a mixture. The compounds of formula I will normally be mixtures since the higher fatty alkyl and alkenyl groups will often be technical mixtures obtained from sources such as tall oil and tallow oil, ethoxylation will generally give a distribution of molecules containing differing numbers of ethoxy groups, and the reaction of compounds II with III, IV and/or V may give mixtures of products. The waxes themselves may be complex mixtures of different waxes and oil, and finally mixtures of alcohols, glycols, etc. may be used as cold stabilisers.

The dispersions according to the invention may be produced in conventional manner by mixing the components. Preferably the wax is melted together with the surfactant and the melt is then added to the water, with vigorous stirring. If an acid is to be present, this is preferably dissolved in the water before the melt is added; if a cold stabiliser is to be present, this is preferably added after the dispersion has been formed. Preferably the water is heated to a temperature above the melting point of the wax before the melt is added, and the resulting emulsion of molten wax in hot water is allowed to cool.

The resulting wax dispersions have good shelf-life and may be stored for long periods without separation. If however separation into distinct layers does occur, the mixture can be brought back into its original wall-dispersed form by simple stirring.

The wax dispersions according to the invention are useful as finishing agents for fibrous substrates, particularly textile materials, and give excellent lubrication and avivage (livening). They may be applied to natural, synthetic or semi-synthetic fibres, and mixtures of these, particularly natural or regenerated cellulose, natural or synthetic polyamide, polyester, polypropylene and polyacrylonitrile. The fibrous substrate can be in any form or stage of manufacture, for example loose fibres, filaments, threads, yarns, yarn hanks and spools, woven and knitted fabrics, fleeces, non-woven fabrics, paper webs, felts, carpets, velvets tufted goods, semi finished articles and artificial leather. Preferred applications are in the paraffin treatment of paper webs, wet paraffin treatment of yarn spools and particularly the avivage (livening) of textile webs, especially of cotton knitted fabrics.

The finishing is carried out from an aqueous, preferably acid, medium, obtained by diluting with water the dispersion according to the invention, and adding acid as necessary to adjust the pH. The pH of the medium is preferably between 3.5 and 6, more preferably between 4 and 5.5. The temperature of the medium is preferably between 10° C. and 60° C., more preferably between 30° and 50° C. The finishing process may be an exhaust or an impregnation process, examples of the latter being dipping, padding, foam application or spraying, suitably in a continuous process.

The finishing agent has good substantivity and is suitable for application by conventional long- or short-bath exhaust processes in goods to liquor ratios of from 1:100 to 1:0.5, preferably 1:60 to 1:2. Preferred short bath processes include those carried out in winchbecks and, particularly, in jet dyeing machines. The treated substrate is preferably dried directly without a rinsing step; drying may be carried out in air at ambient temperatures, or, preferably, in a drier at temperatures for example between 80° C. and 150° C. The concentration of wax applied to the substrates can vary widely according to the nature of the substrate and the effect desired, but preferably is from 0.02% to 1.5%, more preferably from 0.1% to 0.8% calculated on the basis of the dry weight of the substrate.

Since the dispersions according to the invention have very high stability even under conditions of high and non-uniform dynamic stress, they are particularly suitable for finishing of textile webs in jet dyeing machines. Jet dyeing machines are well known and are described for example in the following technical literature:

Anon: Rückblick auf die 6. ITMA 1971 in Paris, Textilveredlung 6 (1971) 11, pp 745-748.

P. Semer: ITMA 75-Färberei and Textilveredlung. Melliand Textilberichte 57(1976) 2, pp 147-149.

R. D. Holt, F. J. Hassigan: Der Ausfall von Sollstückware in Jet- und Overflow-Färbemaschinen; Melliand Textilberichte 60(1979) 9, pp 745-758.

W. J. Marshall "Jet-Dyeing-Machines (Process development and machinery review)", Shirley Institute Publication p 33, (1979).

Jet dyeing machines, especially when not completely filled, subject the treatment bath to very large changes of velocity in different parts of the machine, leading to high shearing forces. Under these conditions a more or less stable foam may be formed, and if the wax dispersion is unstable, wax will separate out and float upon the foam. When the treated goods are discharged, part of the separated wax will adhere to the goods, and cause spotting of the fabric on drying. The dispersions according to the invention are stable enough to withstand these conditions, giving little or no foaming or wax separation, and allowing the substrate to be evenly finished.

The stability of wax dispersions may be tested in the laboratory by means of an apparatus including high shear rates, e.g. by means of a high-speed propellor blade. Household blenders e.g. type MX32 of the company Braun AG, Frankfurt, are suitable for this purpose. In a suitable test method, 5 g of the dispersion are diluted to 1 l with demineralised water, and half of this quantity is placed in the mixing vessel of a Braun MX32 household mixer and blended for 1 minute at speed III. This corresponds to a power of 205 watt±10%, giving a blade velocity in the absence of fluid of 16,000±10% rpm. The dispersion is then sucked with a vacuum of 530 mbar through a 5.7 cm diameter suction filter lined with black cotton cretonne (130 g/m², 16 weft threads and 17 warp threads per cm²). Stable dispersions show no significant residues of white paraffin on the filter cloth. The use of hard water (e.g. 10° dH)* and/or increasing the concentration of the wax dispersion can be used to provide stronger test conditions.

*1° dH = 1 deutscher Härtegard (German degree of hardness) = 10 mg CaO per liter water.

Finishing with the wax dispersion according to the invention does not affect the dyeing or brightening of the substrate.

The following Examples, in which all parts and percentages are by weight, illustrate the invention.

EXAMPLES

Waxes (i) Designation and supplier
 (a) Arco Wax 4154 G (Arco Raffinerie GmbH, Hamburg)
 (b) Arco Wax 1150 G (Arco Raffinerie GmbH, Hamburg)
 (c) Arco Wax 2143 G, Charge 1878 (Arco Raffinerie GmbH, Hamburg)
 (d) Petrolatum, light amber technical (Witco Chemical, Koog aan de Zaan, NL)
 (e) Arco Wax 4158 G (Arco Raffinerie GmbH, Hamburg)

(ii) Properties

| wax | Solidification point in °C. (ASTM D 87) | Drip point in °C. (M-III 3 (75))* | Needle penetration (ASTM D 1321) | oil content (ASTM D 721) | n-paraffin content [M-V 8 (63)]* |
|---|---|---|---|---|---|
| a | 54/56 | 55.9 | ~20 | ≦0.5% | 80–84% |
| b | 50/52 | 53.6 | ~80 | 3–4% | 68–70% |
| c | 43/45 | 48 | ~130 | ~3% | 70–78% |
| d | 48/56 | 51–57 | 160–180 (Conepenetration) |  | 19–22% |
| e | 58/60 | 58.9 | ~20 | ≦0.5% | 88–90% |

*DGF methods for testing of fats, fat products and related materials, by the Deutsche Gesellschaft fur Fettwissenschaften e.V., Munster, Westf. scientific publications catalog, Stuttgart, 1982.

Surfactants

Compounds of average formula

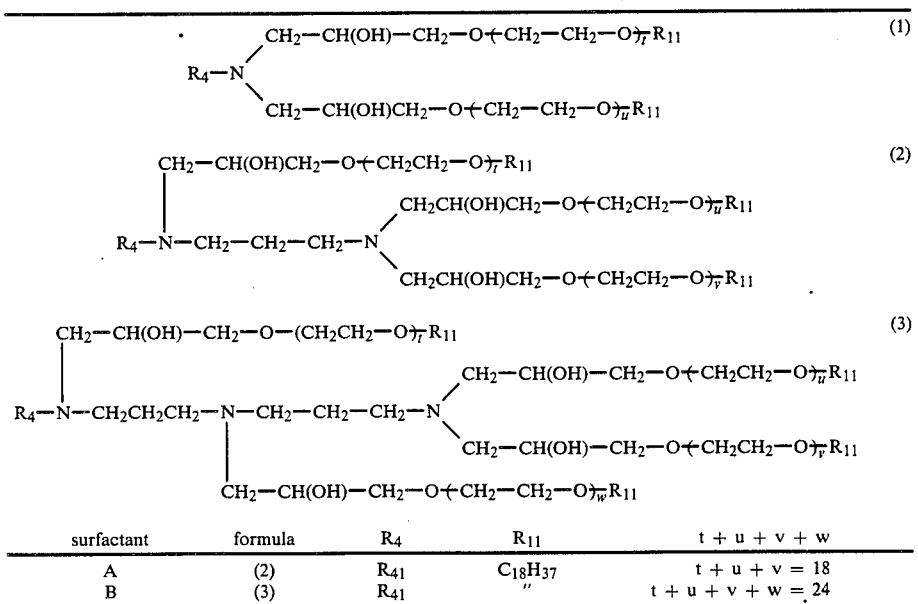

| surfactant | formula | $R_4$ | $R_{11}$ | $t + u + v + w$ |
|---|---|---|---|---|
| A | (2) | $R_{41}$ | $C_{18}H_{37}$ | $t + u + v = 18$ |
| B | (3) | $R_{41}$ | " | $t + u + v + w = 24$ |

-continued

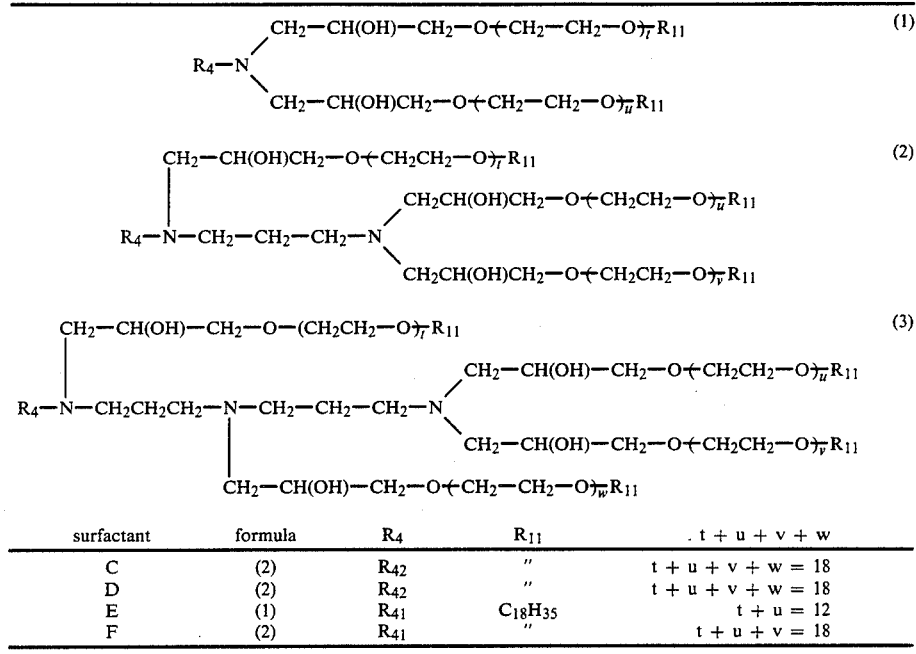

| surfactant | formula | $R_4$ | $R_{11}$ | $t + u + v + w$ |
|---|---|---|---|---|
| C | (2) | $R_{42}$ | " | $t + u + v + w = 18$ |
| D | (2) | $R_{42}$ | " | $t + u + v + w = 18$ |
| E | (1) | $R_{41}$ | $C_{18}H_{35}$ | $t + u = 12$ |
| F | (2) | $R_{41}$ | " | $t + u + v = 18$ | in which $R_{41}$, $R_{42}$ and $R_{43}$ are mixtures of the following compositions:

| $R_{41}$ | $R_{42}$ | $R_{43}$ |
|---|---|---|
| 0,1% $C_{12}H_{25}$— | 3,0% $C_8H_{17}$— | 1,3% $C_{14}H_{29}$— |
| 0,9% $C_{14}H_{29}$— | 6,0% $C_{10}H_{21}$— | 4,7% $C_{16}H_{33}$— |
| 28,0% $C_{16}H_{33}$— | 56,0% $C_{12}H_{25}$— | 42,0% $C_{18}H_{37}$— |
| 28,0% $C_{18}H_{37}$— | 18,0% $C_{14}H_{29}$— | 12,0% $C_{20}H_{41}$— |
| 43,0% $C_{18}H_{35}$— | 10,0% $C_{16}H_{33}$— | 40,0% $C_{22}H_{45}$— |
| | 2,0% $C_{18}H_{37}$— | |
| | 5,0% $C_{18}H_{35}$— | |

Preparation of surfactants

Surfactant A

To 135 parts stearyl alcohol is added in conventional manner 132 parts ethylene oxide, with 0.4 parts caustic soda as catalyst. Then 46.5 parts epichlorohydrin are added, using as catalyst 4 parts of 48% boron trifluoride dietherate at 45°–70° C. The resulting chlorohydrin is then converted to the corresponding epoxide by treatment with 60 parts of 30% caustic soda at 40°–50° C. 60 Parts of the fatty amine $R_{41}NHCH_2CH_2CH_2NH_2$ (see table above for significance of $R_{41}$) is then reacted with the epoxide for 5 hours at 70° C. Finally the water is removed by distillation and the solid sodium chloride by filtration at 80° C. The liquid filtrate solidifies at room temperature.

All steps may be carried out sequentially in the same reaction vessel without isolation of intermediates. Surfactants B–F may be prepared in analogous manner.

Preparation of Wax Dispersions

Method I 156.7 Parts paraffin wax and 84.3 parts surfactant are melted together and stirred into a solution of 15 parts glacial acetic acid in 855 parts demineralised water, heated to 70° C. The resulting fine emulsion is allowed to cool under stirring and 95 parts ethylene glycol are added. A milky low viscosity dispersion is obtained.

Method II

As method I, except that 172 parts wax, 69 parts surfactant, 940 parts water and no ethylene glycol are used.

Method III

60 Parts surfactant and 60 parts wax are melted together and stirred into a solution of 15 parts glacial acetic acid in 425 parts demineralised water, heated to 85° C. The resulting very fine emulsion is allowed to cool, then 47 parts ethylene glycol are added. The resulting dispersion is opalescent and almost clear.

Method IV

As method II, using 855 parts water.

Method V

As method II, replacing the 940 parts water with 855 parts water followed by 95 parts ethylene glycol.

Examples 1–18

Wax dispersions were made using methods I–V, surfactants A–F and waxes a–e as set out in the following table:

| Example | Method | Surfactant | Wax | (weight ratio) |
|---|---|---|---|---|
| 1 | I | A | c | — |
| 2 | I | A | c + d | (9:1) |
| 3 | I | E | b + d | (6:4) |
| 4 | I | F | b + d | (6:4) |
| 5 | I | A | a + d | (6:4) |
| 6 | I | A | e + d | (7:3) |
| 7 | II | D | b + d | (7:3) |
| 8 | II | C | b + d | (9:1) |
| 9 | II | B | b + d | (7:3) |
| 10 | III | A | a | — |
| 11 | III | A | e | — |
| 12 | III | A | b | — |
| 13 | IV | D | b + d | (7:3) |
| 14 | IV | C | b + d | (9:1) |
| 15 | IV | B | b + d | (7:3) |
| 16 | V | D | b + d | (7:3) |

-continued

| Example | Method | Surfactant | Wax | (weight ratio) |
|---|---|---|---|---|
| 17 | V | C | b + d | (9:1) |
| 18 | V | B | b + d | (7:3) |

Application Example A

A textile web of 200 kg cotton interlock (200 g/m²) is treated in a Thiess-Jet R95 machine having three units (3 vessels) with 1600 liters of liquor containing 6 kg of the dispersion of Example 1 (goods:liquor ratio 1:8). The avivage processing is run at a web speed of 180 m/min for 20 minutes at 45° C., and the fabric is dried, without rinsing, at 110°–120° C. and is then ready for use.

Application Example B

Cotton interlock fabric is added to an aqueous bath at 40° C. and a goods:liquor ratio of 1:40, containing (based on dry weight of substrate) 3% of the wax dispersion of Example 3. After constant agitation at 40° C. for 20 minutes, the substrate is removed from the bath and dried without tension at 140° C. for 90 seconds.

Application Examples B1–B7

Example B is repeated using instead of the dispersion of Example 3, the same concentration of the dispersion of Example 4, 7, 8 or 9, or 2% of the dispersion of Example 1, 2 or 10.

Application Example C

Cotton interlock fabric is padded at room temperature with an aqueous liquor containing 30 g/l of the wax dispersion of Example 8, at a pick-up of 75%. Finally the padded material is dried for 90 seconds at 140° C.

Application Examples C1–C4

Example C is repeated using instead of the dispersion of Example 8, the same concentration of the dispersion of Example 3, 5 or 6 or 25 g/l of the dispersion of Example 10.

Application Example D

In a Mathis Laboratory Overflow Jet JFO machine (Mathis AG, Niederhasli/ZH, Switzerland), 1 kg of predyed, tubular cotton tricot interlock fabric (52×520 cm, 185 g/m²), is treated with a liquor containing 55 g of the dispersion of Example 10 in 8 l of tap water (4°–6° dH). The liquor circulation rate is 14,700 l/h, the fabric velocity 23 m/min and the jet diameter 70 mm. After 30 minutes at 25° C. the goods are removed and dried at 110°–120° C.

The goods finished according to the above examples show no wax spots and have good lubrication properties.

What is claimed is:

1. An aqueous wax dispersion in which substantially all of the wax is non-oxidised paraffin wax having a drip point ≧30° C. such that the acid number of the total wax present is less than 1, said dispersion containing an amount sufficient to disperse the wax in the water of a surfactant comprising one or more compounds of formula I

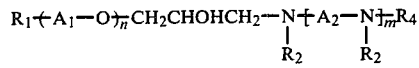

in which $R_1$ is $R_xCOO-$, $R_xCONH-$ or $R_yO-$
where $R_x$ is $C_{7-21}$alkyl or $C_{7-21}$alkenyl
and $R_y$ is $C_{8-22}$alkyl, $C_{8-22}$alkenyl or a group ($\alpha$)

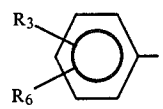

(α)

where $R_3$ is H or $C_{1-9}$alkyl and $R_6$ is $C_{4-12}$alkyl;
$R_2$ is H, $C_{1-22}$alkyl, $C_{2-22}$alkenyl, benzyl or a group (b)

$$-CH_2CHOHCH_2O)_p(A_1O)_qR_5\%; \quad (b)$$

$R_4$ is H, $C_{1-22}$alkyl, $C_{2-22}$alkenyl or a group (b);
$R_5$ is a group (c), (d) or (e)

$$-A_1-O)_rR_z \quad (c)$$

$$-A_1-O)_rCOR_w \quad (d)$$

$$-A_1-NH-COR_w \quad (e)$$

where $R_w$ is $C_{1-21}$alkyl or $C_{2-21}$alkenyl
$R_z$ is $C_{1-22}$alkyl, $C_{2-22}$alkenyl or a group (α);
$A_1$ is $-CH_2CH_2-$ or $-CH_2CH(CH_3)-$;
$A_2$ is $C_{2-6}$alkylene;
n is 2–20;
m is 0–4;
p is 0 or 1;
q is 0–19;
and r is 0 or 1;
with the provisos that (p+q+r)≧1 and whenever a symbol appears more than once it may have the same or different significance, or protonated or quaternised derivatives thereof.

2. An aqueous wax dispersion according to claim 1 in which the n-paraffin content of the wax is 65–90% by weight.

3. An aqueous wax dispersion according to claim 1 in which the paraffin wax has a solidification point in the range 50°–65° C.

4. An aqueous wax dispersion according to claim 1 in which the cationic surfactant of formula I contains at least one alkyl or alkenyl group of 8–22 carbon atoms bound directly to nitrogen.

5. An aqueous wax dispersion according to claim 1 in which, in the cationic surfactant of formula I, at least one $R_2$ or $R_4$ is a group of formula (a)

$$R_1-A_1-O)_nCH_2CHOHCH_2-. \quad (a)$$

6. An aqueous wax dispersion according to claim 1 in which the cationic surfactant comprises one or more compounds of formula I'

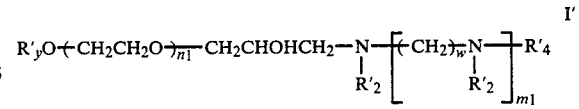

in which $R_y'$ is $C_{12-22}$alkyl, $C_{12-22}$alkenyl or a group ($\alpha'$)

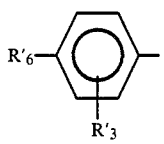

(α')

where $R_3'$ is hydrogen or n-, iso- or tert.-butyl and $R_6'$ is $C_{4-9}$alkyl
$n_1$ is 3–12
$R_2'$ is hydrogen, $C_{1-2}$alkyl or a group of formula (a')

$$R_y'O-(CH_2CH_2O)_{n1}-CH_2CHOHCH_2 \quad (a')$$

$R_4'$ is $C_{8-22}$alkyl, $C_{8-22}$alkenyl or a group (a')
w is 2 or 3 and $m_1$ is 0–2.

7. An aqueous wax dispersion according to claim 6 in which the cationic surfactant comprises one or more compounds of formula I''

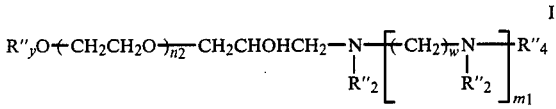

I'' in which
$R_y''$ is $C_{16-22}$alkyl or $C_{16-22}$alkenyl,
$n_2$ is 4–8
$R_2''$ is hydrogen or a group of formula (a'')

$$R_y''O-(CH_2CH_2O)_{n2}-CH_2CHOHCH_2 \quad (a'')$$

provided that at least one group $R_2''$ is a group of formula (a'')
$R_4''$ is $C_{16-22}$alkyl or $C_{16-22}$alkenyl
and w and m are defined in claim 6.

8. An aqueous wax dispersion according to claim 7 in which the cationic surfactant comprises one or more compounds of formula I'''

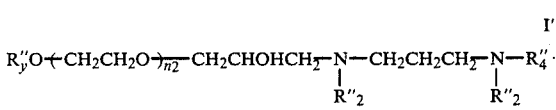

I'''

9. An aqueous wax dispersion according to claim 1 in which the cationic surfactant of formula I is in non-quaternized form.

10. An aqueous wax dispersion according to claim 1 containing a water-soluble cold stabiliser selected from mono- and polyhydric alcohols, polyalkylene glycols and mono- and polyalkyleneglycol ethers.

11. An aqueous wax dispersion according to claim 1 in which for 100 parts by weight of wax there is present 20–150 parts by weight of surfactant of formula I, sufficient acid to bring the pH in the range 3–6, sufficient water to bring the dry weight of wax plus surfactant to 5–50% by weight of the dispersion, and from 0–40% of the weight of water of a cold stabiliser selected from mono- and polyhydric alcohols, polyalkylene glycols and mono- and polyalkyleneglycol ethers.

12. An aqueous wax dispersion according to claim 1 in which the cationic surfactant is a mixture of compounds of the formula (2)

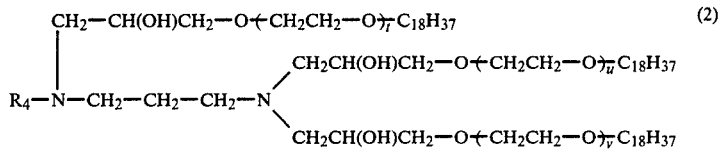

(2)

wherein
$R_4$ is 0.1% $C_{12}H_{25}$—, 0.9% $C_{14}H_{29}$—, 28.0% $C_{16}H_{33}$—, 28.0% $C_{18}H_{37}$— and 43.0% $C_{18}H_{35}$— and the sum of t+u+v is 18.

13. An aqueous wax dispersion according to claim 1 in which the wax is a mixture of n-paraffins and isoparaffins having an n-paraffin content of 30–90%, by weight, and an oil content of 0–30%, by weight.

14. An aqueous wax dispersion according to claim 6 in which the wax is a mixture of n-paraffins and isoparaffins having an n-paraffin content of 65–90%, by weight.

15. An aqueous wax dispersion according to claim 8 in which the wax is a mixture of n-paraffins and isoparaffins having an n-paraffin content of 65–90%.

16. An aqueous wax dispersion according to claim 14 in which the paraffin wax has an oil content of 0.2–15%, by weight.

17. An aqueous wax dispersion according to claim 1 containing, for 100 parts by weight of wax, 20–150 parts by weight of cationic surfactant of formula I.

18. An aqueous wax dispersion according to claim 7 containing, for 100 parts by weight of wax, 20–150 parts by weight of cationic surfactant of formula I''.

19. An aqueous wax dispersion according to claim 14 containing, for 100 parts by weight of wax, 20–150 parts by weight of the cationic surfactant of formula I'.

20. An aqueous wax dispersion according to claim 1 wherein the acid number of the total wax present is less than 0.5.

21. An aqueous wax dispersion according to claim 17 wherein the acid number of the total wax present is less than 0.5.

22. An aqueous wax dispersion according to claim 18 wherein the acid number of the total wax present is less than 0.5.

23. An aqueous wax dispersion according to claim 11 in which for 100 parts by weight of wax there is present 40–120 parts by weight of surfactant of formula I, sufficient acid to bring the pH in the range 3–4.5, sufficient water to bring the dry weight of wax plus surfactant to 10–30% by weight of the dispersion, and from 5–20% of the weight of the water of the cold stabiliser.

* * * * *